United States Patent
Yu et al.

(10) Patent No.: US 12,494,285 B2
(45) Date of Patent: Dec. 9, 2025

(54) PHYSIOLOGICAL INFORMATION MONITORING SYSTEM

(71) Applicant: Quanta Computer Inc., Taoyuan (TW)

(72) Inventors: Yen-Ching Yu, Taoyuan (TW);
Chi-Ming Yang, Taoyuan (TW);
Jui-Wei Chiang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 125 days.

(21) Appl. No.: 18/518,801

(22) Filed: Nov. 24, 2023

(65) Prior Publication Data

US 2024/0420838 A1 Dec. 19, 2024

(30) Foreign Application Priority Data

Jun. 16, 2023 (TW) ................................ 112122645

(51) Int. Cl.
*G16H 40/67* (2018.01)
*H04L 9/08* (2006.01)
*H04W 4/80* (2018.01)
*H04W 12/033* (2021.01)

(52) U.S. Cl.
CPC ........... *G16H 40/67* (2018.01); *H04L 9/0891* (2013.01); *H04W 4/80* (2018.02); *H04W 12/033* (2021.01)

(58) Field of Classification Search
CPC ...... G16H 40/67; H04W 4/80; H04W 12/033; H04L 9/0891
See application file for complete search history.

(56) References Cited

U.S. PATENT DOCUMENTS

| | | | |
|---|---|---|---|
| 2017/0048062 A1* | 2/2017 | Polak | H04L 9/0866 |
| 2019/0215369 A1* | 7/2019 | Pry | H04W 12/02 |
| 2020/0036792 A1* | 1/2020 | Palin | H04W 4/80 |
| 2021/0313074 A1* | 10/2021 | Mesirow | H04W 4/029 |
| 2023/0066604 A1* | 3/2023 | Huang | H04L 9/40 |
| 2023/0214608 A1* | 7/2023 | Larson | H04W 4/029 340/10.3 |

FOREIGN PATENT DOCUMENTS

TW 202307866 A 2/2023

OTHER PUBLICATIONS

Chinese language office action dated Dec. 29, 2023, issued in application No. TW 112122645.

* cited by examiner

*Primary Examiner* — Chris Parry
*Assistant Examiner* — Abderrahmen Chouat
(74) *Attorney, Agent, or Firm* — McClure, Qualey & Rodack, LLP

(57) ABSTRACT

An embodiment of the invention provides a physiological information monitoring system. The physiological information monitoring system may include a server, a monitoring device and at least one gateway. The server may store and analyze physiological information of a user. The monitoring device may measure the physiological information and broadcast a Bluetooth Low Energy (BLE) advertising packet comprising the physiological information. The gateway may detect the BLE advertising packet and transmit the detected BLE advertising packet to the server.

7 Claims, 2 Drawing Sheets

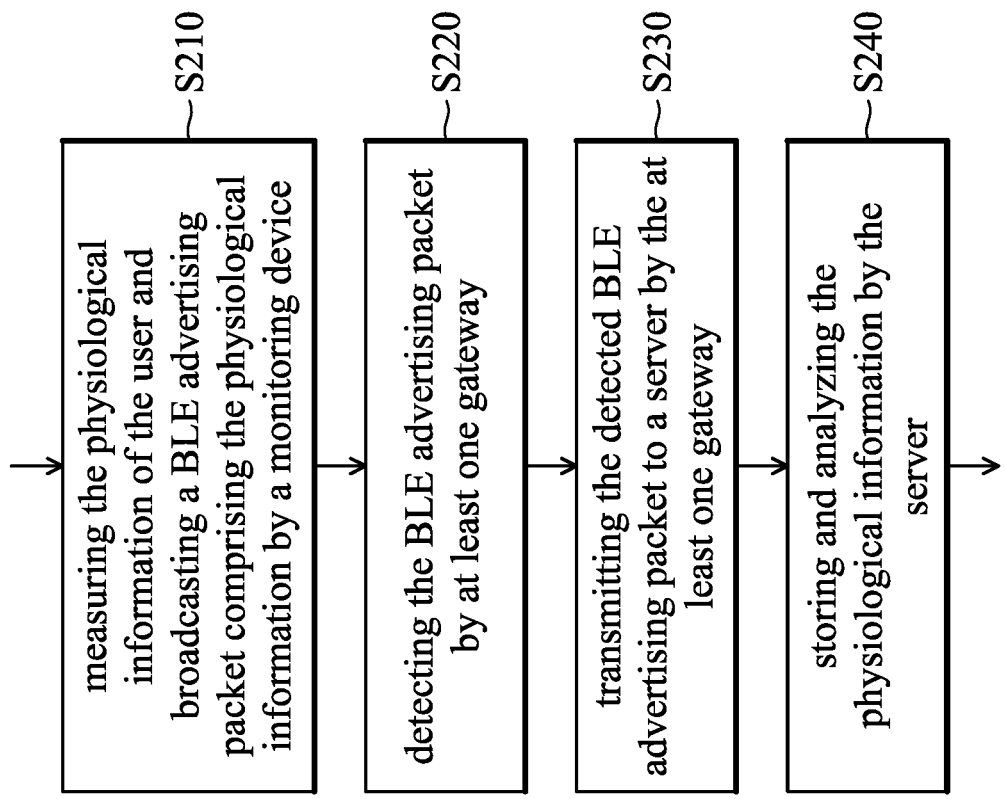

PHYSIOLOGICAL INFORMATION MONITORING SYSTEM

CROSS REFERENCE TO RELATED APPLICATIONS

This application claims priority of TW patent application No. 112122645 filed on Jun. 16, 2023, the entirety of which is incorporated by reference herein.

BACKGROUND OF THE INVENTION

Field of the Invention

The invention generally relates to physiological information monitoring technology, and more particularly, to physiological information monitoring technology in which a monitoring device uses Bluetooth low energy (BLE) advertising packet to perform the physiological information monitoring.

Description of the Related Art

As medical science and technology continue to progress, the requirements for measuring and analyzing the physiological signals of human beings are increasing. Blood oxygen monitoring devices are usually used to monitor the blood oxygen saturation level (SpO2) and pulse rate (PR) of users.

However, a blood oxygen monitoring device traditionally needs to establish a connection with a gateway before transmitting the physiological information of the user through the gateway. Therefore, how to more conveniently and safely transmit the physiological information of the user from the blood oxygen monitoring device to the gateway, and then transmit the physiological information of the user to a remote server through the gateway to immediately analyze the physiological information of the user is a topic that is worthy of discussion.

BRIEF SUMMARY OF THE INVENTION

A physiological information monitoring system and method are provided to overcome the problems mentioned above.

An embodiment of the invention provides a physiological information monitoring system. The physiological information monitoring system may include a server, a monitoring device and at least one gateway. The server may store and analyze physiological information of a user. The monitoring device may measure the physiological information and broadcast a Bluetooth Low Energy (BLE) advertising packet comprising the physiological information. The gateway may detect the BLE advertising packet and transmit the detected BLE advertising packet to the server.

In some embodiments, the gateways may be a plurality of fixed gateways. The fixed gateways may transmit the signal strength information corresponding to the detected BLE advertising packet to the server. The server may obtain the location information of the monitoring device according to a look-up table and the signal strength information.

In some embodiments, the gateway may be a mobile phone gateway. The mobile phone gateway may transmit its location information to the server, and the server may obtain the location information of the monitoring device according to the location information corresponding to the mobile phone gateway.

In some embodiments, the BLE advertising packet may further comprise the power information, product information and the measurement time information of the monitoring device.

In some embodiments, the monitoring device may encrypt the physiological information in the BLE advertising packet according to a first encryption program and a second encryption program, and encrypt the measurement time information in the BLE advertising packet according to a third encryption program, wherein the first encryption program, the second encryption program, and the third encryption program are different.

In some embodiments, when an encryption key needs to be updated, the server may generate an encryption value of a new key by using the first encryption program to encrypt the new key, and transmit the encryption value and an old key to the gateway to transmit the encryption value to the monitoring device. The monitoring device may use the inverse first encryption key to decrypt the encryption value to obtain the new key, and use the new key to encrypt the information of the next BLE advertising packet.

An embodiment of the invention provides a physiological information monitoring method. The physiological information monitoring method is applied to a physiological information monitoring system. The physiological information monitoring method comprises the following steps. The monitoring device of the physiological information monitoring system may measure the physiological information of the user and broadcast a Bluetooth Low Energy (BLE) advertising packet comprising the physiological information. Then, the gateway of the physiological information monitoring system may detect the BLE advertising packet and transmit the detected BLE advertising packet to the server of the physiological information monitoring system. Then, The server may store and analyze the physiological information.

Other aspects and features of the invention will become apparent to those with ordinary skill in the art upon review of the following descriptions of specific embodiments of a physiological information monitoring system and method.

BRIEF DESCRIPTION OF THE DRAWINGS

The invention will become more fully understood by referring to the following detailed description with reference to the accompanying drawings, wherein:

FIG. 2 is a flow chart illustrating a physiological information monitoring method according to an embodiment of the invention.

DETAILED DESCRIPTION OF THE INVENTION

Figure 1:
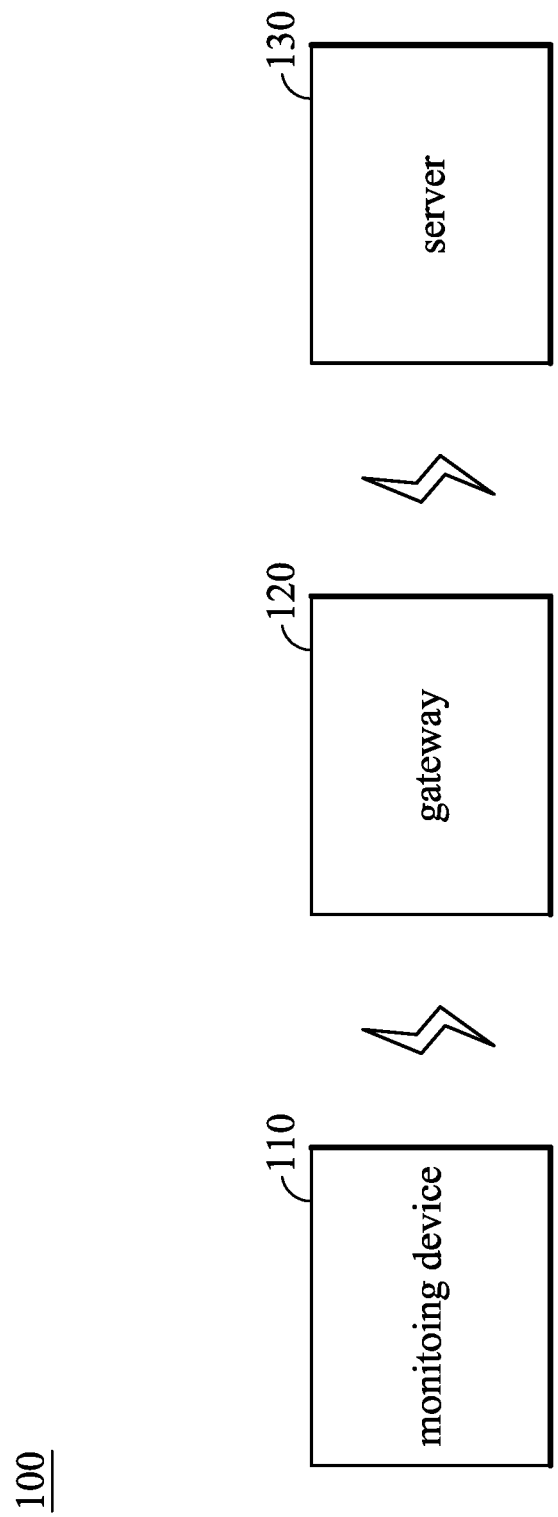
FIG. 1 is a block diagram of a physiological information monitoring system 100 according to an embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

FIG. 1 is a block diagram of a physiological information monitoring system 100 according to an embodiment of the invention. As shown in FIG. 1, the physiological information monitoring system 100 may comprise a monitoring device 110, a gateway 120 and a server 130. It should be noted that FIG. 1 presents a simplified block diagram in which only the elements relevant to the invention are shown. However, the invention should not be limited to what is shown in FIG. 1. The physiological information monitoring system 100 may also comprise other elements. For example, the physiological information monitoring system 100 may also comprise a plurality of gateways.

According an embodiment of the invention, the monitoring device 110 may be a blood oxygen monitoring device.

According to an embodiment of the invention, the monitoring device 110 may comprise a measuring circuit to measure the physiological information (e.g., blood oxygen saturation level (i.e., SpO2 value), heartbeat (i.e., pulse rate (PR) value), and perfusion index (PI) value) of the user periodically (e.g., every 10 seconds, 30 seconds, 1 minutes, 5 minutes, and so on).

According to an embodiment of the invention, the monitoring device 110 may comprise a communication circuit to broadcast the Bluetooth Low Energy (BLE) advertising packets. The BLE advertising packet may comprise the measured physiological information of the user, the power information of the monitoring device 110, the measurement time information of the monitoring device 110 (i.e., the time of measuring the physiological information of the user), and product information of the monitoring device 110 (e.g., manufacture, product name, product serial number, and so on).

Table 1 shows a manufacturer specific data sub-packet format of BLE advertising packet according an embodiment of the invention, but the invention should not be limited thereto. That is, the manufacturer specific data sub-packet format of BLE advertising packet show in Table 1 can be suitably adjusted and changed based on different requirements, e.g., the manufacturer specific data sub-packet format of BLE advertising packet may comprise more fields, the values may be encrypted based on different encryption program.

TABLE 1

| field name | type | company | measurement time | SpO2 | random value | PI(1) | PI(2) | PR | power |
|---|---|---|---|---|---|---|---|---|---|
| size | 1B | 2B | 4B | 1B | 1B | 1B | 1B | 1B | 1B |
| Value or encryption program | 0xff | 0xffff | S3 | S1 | | S2 | S1 | S2 | S1 |

As shown in Table 1, the manufacturer specific data sub-packet format of BLE advertising packet may comprise type (recording the type of packet, e.g., 0xff means that the type is the manufacturer specific data sub-packet), company (recording the company identification (ID), where the ID may be assigned by the Bluetooth Special Interest Group (SIG), and 0xffff may means that the company ID is not indicated), measurement time, SpO2 value, random value, the integer part (PI(1)) of PI value, the decimal part (PI(2)) of PI value, PR value and battery power (recording the power information of the monitoring device 110). In addition, in Table 1, 1B means that the value is expressed by 1 byte, 2B means that the value is expressed by 2 byte, and 4B means that the value is expressed by 4 byte. In addition, in Table 1, 1S means that the value is encrypted by a first encryption program, 2S means that the value is encrypted by a second encryption program, and 3S means that the value is encrypted by a third encryption program.

According to an embodiment, the monitoring device 110 may comprise an encryption and decryption circuit to encrypt the physiological information in the BLE advertising packet. According to an embodiment of the invention, the encryption and decryption circuit may encrypt the physiological information in the BLE advertising packet according to the first encryption program and the second encryption program, where the first encryption program and the second encryption program are different encryption programs. For example, the encryption and decryption circuit may encrypt the SpO2 value and the PI value according to the first encryption program and encrypt the PR value according to the second encryption program, but the invention should not be limited thereto. In another example, the encryption and decryption circuit may encrypt the integer part of PI value according to the first encryption program and encrypt the decimal part of PI value according to the second encryption program. In another example, the encryption and decryption circuit may encrypt the power information of the monitoring device 110 according to the first encryption program or the second encryption program. In addition, according to an embodiment of the invention, the second encryption program may be an inverse first encryption program, but the invention should not be limited thereto.

Specifically, the encryption and decryption circuit may use the first encryption program and the second encryption program to perform calculation to the values which need to be encrypted, a key, and a random value to encrypt the values which need to be encrypted. The key may be provided by the sever 130 in advance, and stored in the monitoring device 110. The random value may be generated by the encryption and decryption circuit, and the encryption and decryption circuit may adopt different random values for every time broadcasting the BLE advertising packet. For example, the first encryption program may be expressed by S1(V, Rand, key)=(V+Rand+key)&0xff, and the second encryption program may be expressed by S2(V, Rand, key)=(V−Rand−key)&0xff, where S1 means the first encryption program, S1 means the second encryption program, V means the value which needs to be encrypted, Rand means the random values, key means the key value and 0xff means that only the last 8 bits value are extracted. It should be noted that the example of the first encryption program and the second encryption program is only an embodiment of the invention, but the invention should not be limited thereto. The encryption and decryption circuit may also adopt other appropriate encryption programs to encrypt the values.

In addition, according to an embodiment of the invention, the encryption and decryption circuit may encrypt the measurement time information of the BLE advertising packet according to a third encryption program, wherein the third encryption program is different from the first encryption program and the second encryption program. Specifically, the encryption and decryption circuit may use the third encryption program to perform calculation to the values which need to be encrypted, a key, and a random value to encrypt the values which need to be encrypted. The encryption and decryption circuit may adopt different random values for every time broadcasting the BLE advertising packet. For example, the third encryption program may be expressed by S3(V, Rand, key)-(V-Rand+2*key)&0xff, where S3 means the third encryption program, V means the measurement time information which needs to be encrypted, Rand means the random values, key means the key value and 0xff means that only the last 8 bits value are extracted. According to an embodiment of the invention, the encrypted measurement time information may also be decrypted according to the inverse third encryption program (e.g., inverse S3(V, Rand, key)-(V+Rand-2*key)&0xff). In an embodiment, 4 bytes decrypted measurement time information may also further be decrypted according to the settings of Table 2.

TABLE 2

| year | month | day | hour | minute | second |
|---|---|---|---|---|---|
| 0~63(i.e., 2000~2063) | 1~12 | 1~31 | 0~23 | 0~59 | 0~59 |
| 6 bits | 4 bits | 5 bits | 5 bits | 6 bits | 6 bits |

It should be noted that the example of the third encryption program is only an embodiment of the invention, but the invention should not be limited thereto. The encryption and decryption circuit may also adopt other appropriate encryption programs to encrypt the measurement time information.

According to an embodiment of the invention, the monitoring device 110 may comprise a processor to control the operations of the measuring circuit, the communication circuit and the encryption and decryption circuit. In an embodiment, the processor, the measuring circuit, the communication circuit and the encryption and decryption circuit may also be integrated into a chip. According to an embodiment of the invention, the operations of the encryption and decryption circuit may be realized through software, and the processor may perform the program codes corresponding to the software to perform the operations corresponding to the encryption and decryption circuit.

According to an embodiment, the monitoring device may comprise a storage circuit. The storage circuit may store the software and firmware program codes, system data, etc. of the monitoring device 110. The storage circuit may be a volatile memory (e.g. Random Access Memory (RAM)), or a non-volatile memory (e.g. flash memory, Read Only Memory (ROM)), a hard disk, or a combination of the above memory devices.

According the embodiments of the invention, the gateway 120 may detect or scan whether there is any BLE advertising packet broadcasted by the monitoring device 110 in its coverage range. That is, in the invention, the gateway may obtain the BLE advertising packet without establishing connection with the monitoring device 110. When the gateway 120 detects or scans the BLE advertising packet broadcasted by the monitoring device 110, the gateway 120 may transmit the detected or scanned BLE advertising packet to the server 130 through a wire communication method or wireless communication methods (e.g., Wi-Fi, Ethernet, 4G, 5G, and so on). The server 130 may obtain the physiological information and location information of the user of the monitoring device 110 according to the BLE advertising packet and other information from the gateway 120. Details will be illustrated below.

According to an embodiment of the invention, the gateways 120 may be a plurality of fixed gateways. The fixed gateways may be previously disposed in different positions of an environment (e.g., hospital) where the user of the monitoring device 110 is. Each fixed gateway may detect or scan whether there is any broadcasted BLE advertising packet in its coverage range, and find the BLE advertising packet broadcasted by the monitoring device 110 from the detected and scanned BLE advertising packets. The fixed gateways may read the BLE advertising packet from the monitoring device 110, and transmit the BLE advertising packet to the server 130. In addition, in the embodiment, each fixed gateway may further measure the signal strength information corresponding to the BLE advertising packet, and transmit the signal strength information to the server 130. Because each fixed gateway may be disposed in different positions, the signal strength information measured by each fixed gateway may also be different. Therefore, the server 130 may obtain the location information of the monitoring device 110 (or the user of the monitoring device 110) according to a look-up table and the signal strength information from each fixed gateway. The look-up table may be pre-stored in the server 130. The look-up table may record a group of fixed gateways which measure the strongest signal strength when the monitoring device 110 at some specific location points, and record the signal strength measured by the group of fixed gateways. Taking Table 3 as an example, Table 3 shows a look-up table according to an embodiment of the invention. As shown in Table 3, Tables record the six gateways corresponding to the strongest signal strength at different location points. For example, at the location point P1, the six gateways corresponding to the strongest signal strength are gateway 2, gateway 1, gateway 4, gateway 6, gateway 3 and gateway 5.

TABLE 3

| location point | first gateway | second gateway | third gateway | fourth gateway | fifth gateway | sixth gateway |
|---|---|---|---|---|---|---|
| P1 | gateway2: signal strength 30 | gateway1: signal strength 27 | gateway 4: signal strength 24 | gateway 6: signal strength 22 | gateway 3: signal strength 18 | gateway 5: signal strength 15 |
| P2 | gateway 1: signal strength 32 | gateway 2: signal strength 27 | gateway 3: signal strength 25 | gateway 5: signal strength 21 | gateway 4: signal strength 17 | gateway 6: signal strength 15 |
| P3 | gateway 12: signal strength 31 | gateway 3: signal strength 22 | gateway 7: signal strength 20 | gateway 6: signal strength 19 | gateway 4: signal strength 17 | gateway 11: signal strength 15 |
| P4 | gateway 12: signal strength 31 | gateway 3: signal strength 22 | gateway 7: signal strength 20 | gateway 9: signal strength 19 | gateway 5: signal strength 17 | gateway 11: signal strength 15 |
| . . . | . . . | . . . | . . . | . . . | . . . | . . . |

Therefore, when the server 130 receives the signal strength information (corresponding to the BLE advertising packet broadcasted by the same monitoring device 110) from each fixed gateway, the server 130 may select a group of fixed gateways corresponding to the strongest signal strength information, and then the server 130 may compare to the recorded contents of the look-up table to find the closest location point (i.e., the location information of the monitoring device 100) of the monitoring device 110 (or the user of the monitoring device 110). Specifically, taking Table 3 as an example, when the server 130 receives the signal strength information (corresponding to the BLE advertising packet broadcasted by the same monitoring device 110) from each fixed gateway, the server 130 may select six gateways corresponding to the strongest signal strength. The six fixed gateways selected by the server 130 may be gateway 12 (signal strength 30), gateway 3 (signal strength 21), gateway 7 (signal strength 19), gateway 9 (signal strength 19), gateway 5 (signal strength 18) and gateway 11 (signal strength 16).

Then, the server 130 may find the location points at which the strongest signal strength corresponds to the gateway 12 (i.e., the location point P3 and the location point P4 whose first gateway is the gateway 12 in Table 3). Then, the server 130 may compare the selected six fixed gateways to the six fixed gateways corresponding to the location point P3 and the six fixed gateways corresponding to the location point P4 respectively, and then, the signal strength of the matched fixed gateways may be multiplied each other and the multiplied value may be added up to obtain the total values corresponding to the location point P3 and the location point P4. Specifically, the matched fixed gateways between the six fixed gateways (gateway 12, gateway 3, gateway 7, gateway 9, gateway 5, and gateway 11) selected by the server 130 and the six fixed gateways (gateway 12, gateway 3, gateway 7, gateway 6, gateway 4, and gateway 11) corresponding to the location point P3 are only gateway 12, gateway 3, gateway 7, and gateway 11. Therefore, the total value corresponding to location point P3 is 31*30+22*21+20*19+15*16=2012. The matched fixed gateways between the six fixed gateways (gateway 12, gateway 3, gateway 7, gateway 9, gateway 5, and gateway 11) selected by the server 130 and the six fixed gateways (gateway 12, gateway 3, gateway 7, gateway 9, gateway 5, and gateway 11) corresponding to the location point P4 are gateway 12, gateway 3, gateway 7, gateway 9, gateway 5, and gateway 11. Therefore, the total value corresponding to location point P4 is 31*30+22*21+20*19+19*19+17*18+15*16=2079. Because the total value corresponding to location point P4 is greater than the total value corresponding to location point P3, the server 130 may determine that the monitoring device 110 (or the user of the monitoring device 110) is closest to the location point P4 (i.e., the location information of the monitoring device 100).

In addition, in an embodiment, after a default time (e.g., 3 second), when the server 130 selects a new group of fixed gateways corresponding to the strongest signal strength, the server 130 may calculate a differential value between the total value corresponding the location point (e.g., location point P4) which the monitoring device 110 corresponds to previously and the total value currently corresponding the location point (e.g., location point P4). When the differential value is smaller than a default value (e.g., 30) and the fixed gateways corresponding to the strongest signal strength are the same, the server 130 may determine that the monitoring device 110 (or the user of the monitoring device 110) does not move. In addition, if the server 130 determines that the monitoring device 110 (or the user of the monitoring device 110) moves, the server 130 may exclude the fixed gateways whose distance between the prior location point (e.g., location point P4) is longer than a default value (e.g., 15 meters) from the new group of fixed gateways, and then, the server 130 may find the location point which is closest to the monitoring device 110 (or the user of the monitoring device 110) based on the above methods. The new found location point will be taken as a determination base after the next default time.

According to another embodiment, the gateway 120 may be a mobile phone gateway (i.e., the gateway 120 may be the mobile phone of the user of the monitoring device 100). The mobile phone gateway may detect or scan whether there is any broadcasted BLE advertising packet in its coverage range, and find the BLE advertising packet broadcasted by the monitoring device 110 from the detected and scanned BLE advertising packets. The mobile phone gateway may read the BLE advertising packet from the monitoring device 110, and transmit the BLE advertising packet to the server 130. In addition, in the embodiment of the invention, the mobile phone gateway may transmit the global positioning system (GPS) information with the BLE advertising packet to the server 130. The server 130 may take the GPA information of the mobile phone gateway as the location information of the monitoring device 110 (or the user of the monitoring device 110).

According to an embodiment of the invention, the gateway 120 (fixed gateway or mobile phone gateway) may obtain the measurement time information of the BLE advertising packet of the monitoring device 110. The gateway 120 may determine whether the deviation between its time and the measurement time of the monitoring device 110 is greater than a default value (e.g., 2 second) based on the measurement time information of the monitoring device 110. If the deviation between the time of the gateway 120 and the measurement time of the monitoring device 110 is greater than the default value, the gateway 120 may establish connection with the monitoring device to update the time of the monitoring device 110 and synchronize the time with the server 130.

According to an embodiment of the invention, after the server 130 obtains the BLE advertising packet and the location information corresponding to the user of the monitoring device 110, the server 130 may decrypt the BLE advertising packet based on the decryption program corresponding to the encryption program (e.g., inverse first encryption program, inverse second encryption program, but the invention should not be limited thereto). After the BLE advertising packet is decrypted, the server 130 may store the physiological information and location information of the user of the monitoring device 110, and analyze the physiological information of the user of the monitoring device 110.

According to an embodiment of the invention, the server 130 may determine whether the physical condition of the user of the monitoring device 110 is abnormal based on the physiological information in the decrypted BLE advertising packet. When the server 130 determines that the physical condition of the user of the monitoring device 110 is abnormal, the server 130 may transmit the location information of the user of the monitoring device 110 to the emergency medical unit or ambulance first responder to perform an emergency medical procedure on the user of the monitoring device 110.

In addition, according to an embodiment of the invention, the server 130 may determine whether the power of the monitoring device 110 is lower than a threshold based on the power information of the monitoring device 110 in the decrypted BLE advertising packet. When the server 130 determines that the power of the monitoring device 110 is lower than a threshold, the server 130 may transmit a notification to the user or the caregiver to charge the monitoring device 110.

In addition, according to an embodiment of the invention, if the server 130 receive the BLE advertising packets of the same monitoring device 110 from different gateways (e.g., a plurality of fixed gateways) at the same time, based on the measurement time information and the product information of the monitoring device 110 in the decrypted BLE advertising packets, the server 130 may determine whether the different BLE advertising packets received at the same time carry the same physiological information. If the server 130 determines that the different BLE advertising packets received at the same time carry the same physiological information, the server 130 may filter the repeat BLE advertising packet.

According to an embodiment, the server 130 may be further configured to update the key for the encryption and decryption. For example, when an encryption key needs to be updated, the server 130 may use the first encryption program (e.g., S1 (new key, Rand, old key), wherein the value of Rand may be a fixed value 0x80) to encrypt a new key to generate an encryption value of the new key. Then, the server 130 may transmit the encryption value of the new key and the old key to the gateway 120. The gateway 120 may calculate the measurement time based on the old key and the third encryption program to determine whether the monitoring device 110 still uses the old key. If the gateway 120 determines that the monitoring device 110 still uses the old key, the gateway 120 may establish a BLE connection with the monitoring device 110 to transmit the encryption value of the new key to the monitoring device 110. The monitoring device 110 may use the inverse first encryption program (if the value of Rand is 0x80 in first encryption program, the value of Rand in the inverse first encryption program may also be 0x80) to decrypt the encryption value of the new key to obtain the new key. When the monitoring device 110 obtains the new key, the monitoring device 110 may use the new key to encrypt the information in the next BLE advertising packet. It should be noted that, in the embodiments of the invention, the gateway 120 cannot know the first encryption program, the second encryption program and the new key.

FIG. 2 is a flow chart illustrating a physiological information monitoring method according to an embodiment of the invention. The physiological information monitoring method of FIG. 2 can be applied to the physiological information monitoring system 100. As shown in FIG. 2, in step S210, a monitoring device of the physiological information monitoring system 100 may measure the physiological information of the user and broadcast a BLE advertising packet comprising the physiological information.

In step S220, at least one gateway of the physiological information monitoring system 100 may detect the BLE advertising packet.

In step S230, the at least one gateway of the physiological information monitoring system 100 may transmit the detected BLE advertising packet to a server of the physiological information monitoring system 100.

In step S240, the server of the physiological information monitoring system 100 may store and analyze the physiological information.

According to an embodiment of the invention, in the physiological information monitoring method, the gateways may be a plurality of fixed gateways. The fixed gateways may transmit the signal strength information corresponding to the detected BLE advertising packet to the server. The server may obtain the location information of the monitoring device according to a look-up table and the signal strength information.

According to an embodiment of the invention, in the physiological information monitoring method, the gateway may be a mobile phone gateway. The mobile phone gateway may transmit its location information (i.e., GPS information) to the server, and the server may obtain the location information of the monitoring device according to the location information corresponding to the mobile phone gateway.

According to an embodiment of the invention, in the physiological information monitoring method, the BLE advertising packet may further comprise the power information, product information and the measurement time information of the monitoring device.

According to an embodiment of the invention, in the physiological information monitoring method, the monitoring device of the physiological information monitoring system 100 may encrypt the physiological information in the BLE advertising packet according to a first encryption program and a second encryption program, and encrypt the measurement time information in the BLE advertising packet according to a third encryption program, wherein the first encryption program, the second encryption program, and the third encryption program are different.

According to an embodiment of the invention, in the physiological information monitoring method, when an encryption key needs to be updated, the server of the physiological information monitoring system 100 may generate an encryption value of a new key by using the first encryption program to encrypt the new key, and transmit the encryption value and an old key to the gateway of the physiological information monitoring system 100 to transmit the encryption value to the monitoring device of the physiological information monitoring system 100. The monitoring device of the physiological information monitoring system 100 may use the inverse first encryption key to decrypt the encryption value to obtain the new key, and use the new key to encrypt the information of a next BLE advertising packet.

According to the physiological information monitoring method provided in the invention, the monitoring device of the physiological information monitoring system may transmit the physiological information of the user to the gateway of the physiological information monitoring system by broadcasting the BLE advertising packet. That is, the monitoring device can transmit the physiological information of the user to the gateway without establishing connection with the gateway. Therefore, the monitoring device can transmit the physiological information of the user more conveniently and the power consumption can be decreased. In addition, the gateway may transmit the BLE advertising packet to the server, and the server can perform remote monitor for the physical condition of the user immediately.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A physiological information monitoring system, comprising:
    a server, storing and analyzing physiological information of a user;
    a monitoring device, measuring the physiological information and broadcasting a Bluetooth Low Energy (BLE) advertising packet comprising the physiological information; and
    at least one gateway, detecting the BLE advertising packet and transmitting the detected BLE advertising packet to the server,
    wherein the BLE advertising packet further comprises power information, product information and measurement time information of the monitoring device,
    wherein the monitoring device encrypts the physiological information in the BLE advertising packet according to a first encryption program and a second encryption program, and encrypts the measurement time information in the BLE advertising packet according to a third encryption program, wherein the first encryption program, the second encryption program, and the third encryption program are different, and
    wherein when an encryption key needs to be updated, the server generates an encryption value of a new key by using the first encryption program to encrypt the new key, and transmits the encryption value and an old key to the at least one gateway to transmit the encryption value to the monitoring device.

2. The physiological information monitoring system of claim 1, wherein the at least one gateway is a plurality of fixed gateways.

3. The physiological information monitoring system of claim 2, wherein the plurality of fixed gateways transmit signal strength information corresponding to its detected BLE advertising packet to the server.

4. The physiological information monitoring system of claim 3, wherein the server obtains location information of the monitoring device according to a look-up table and the signal strength information.

5. The physiological information monitoring system of claim 1, wherein the at least one gateway is a mobile phone gateway.

6. The physiological information monitoring system of claim 5, wherein the mobile phone gateway transmits its location information to the server, and the server obtains location information of the monitoring device according to the location information corresponding to the mobile phone gateway.

7. The physiological information monitoring system of claim 1, wherein the monitoring device uses an inverse first encryption key to decrypt the encryption value to obtain the new key, and use the new key to encrypt information of a next BLE advertising packet.

* * * * *